UNITED STATES PATENT OFFICE.

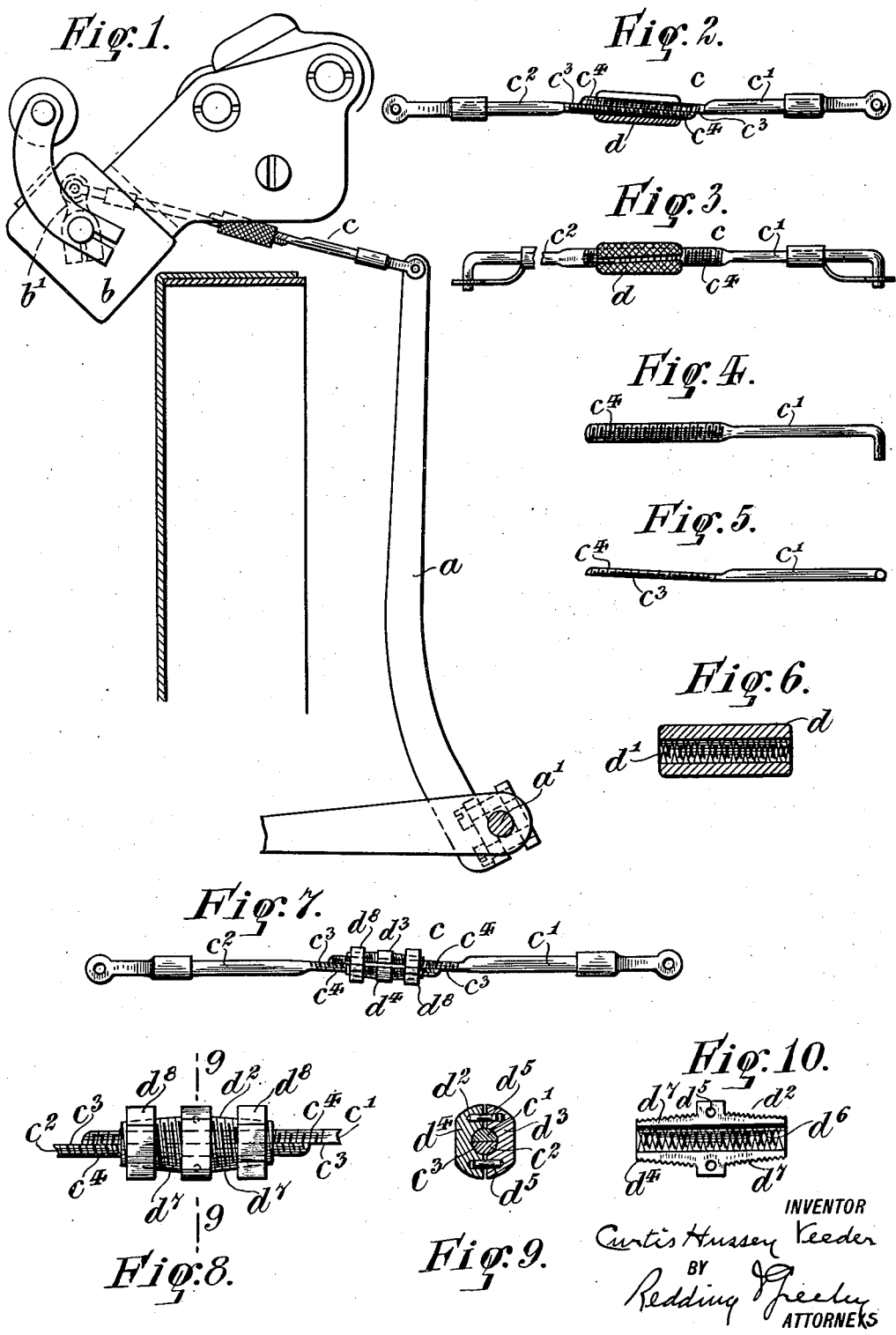

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

TURNBUCKLE.

1,421,866.     Specification of Letters Patent.     Patented July 4, 1922.

Application filed October 8, 1921. Serial No. 506,288.

*To all whom it may concern:*

Be it known that I, CURTIS HUSSEY VEEDER, a citizen of the United States, residing at Hartford, in the State of Connecticut, have invented certain new and useful Improvements in Turnbuckles, of which the following is a specification, reference being had to the accompanying drawing, forming a part hereof.

This invention relates to the construction of turnbuckles or similar devices which permit a variation in length. The invention has been developed with particular reference to its application to links for use in machines in which it is desirable that the two ends of the link shall remain at all times in the same angular relation. In accordance with the invention the two parts of the link are swedged or flattened on one side so that they may slide longitudinally, one upon the other, without change of angular relation, are threaded reversely, one part with respect to the other, and are engaged by a nut which is tapped out with both right and left hand threads, so that rotation of the nut will effect relative longitudinal movement of the two parts. Provision is made whereby accidental movement is prevented. The invention will be more fully explained hereinafter with reference to the accompanying drawing in which it is illustrated and in which—

Figure 1 is a partial view illustrating the application of the improved turnbuckle to the connection between a portion of a typewriter mechanism and a counter.

Figure 2 is a view in elevation of the link shown in Figure 1 with the nut in longitudinal section.

Figure 3 is a view of the link in elevation as seen from a point of view at right angles to that of Figure 2.

Figures 4 and 5 are views in elevation, from different points of view, of one part of the link.

Figure 6 is a view in longitudinal section of the nut shown in Figures 1, 2 and 3.

Figure 7 is a view in elevation of a link which embodies the invention in a modified form.

Figure 8 is a partial detail view in elevation from a point of view at right angles to that of Figure 7 and on a larger scale.

Figure 9 is a detail view in section on the plane indicated by the broken line 9—9 of Figure 8.

Figure 10 is an inside view in elevation of one part of the nut shown in Figures 7, 8 and 9.

The improved turnbuckle is capable of application to machines of different characters. For the purpose of enabling the invention to be understood it is shown in Figure 1 of the drawings as embodied in a link $c$ which forms the connection between an arm $a$ which is shown as clamped on a rocking shaft $a'$, the oscillations of which are to be registered, and the driving arm $b'$, of a counter $b$, by which the oscillations of the shaft $a'$ are to be registered. The shaft $a'$ in this instance is taken to be a shaft of a typewriting machine. Neither the construction of the typewriting machine nor the construction of the counter are any way involved with the present invention except so far as they render desirable the employment of a turnbuckle connection which neither requires nor permits any change in the angular relation of the two parts of the link connection. The link $c$ is shown as comprising two parts, $c'$ and $c^2$, adapted for engagement respectively with the arm $a$ and the arm $b'$. Each part is swedged or otherwise flattened, as at $c^3$ for a portion of its length in order that it may co-operate with the other similarly formed part so that one part may slide upon the other, to vary the total length of the link without change in the angular relation of the two parts. Each part $c'$ and $c^2$ is also threaded, as at $c^4$, the two parts being threaded reversely, that is, one part is formed with a right hand thread and the other part with a left hand thread. The two swedged parts, when placed together, preferably have a combined cross section which is circular.

In both of the embodiments of the invention illustrated in the drawings the two parts $c'$ and $c^2$ are engaged by a nut which is tapped out with both right and left hand threads, so that by rotation of the nut on the two assembled parts the two parts are moved longitudinally, the one with respect to the other, to vary the total length of the link. In the embodiment of the invention illustrated in Figures 1, 2, 3 and 6, the nut $d$, in one piece, is split longitudinally so that it will grip tightly the two parts $c'$ and $c^2$ and accidental movement of any of the parts will be prevented thereby. The nut is tapped out, as indicated at $d'$, with cross threads, that is, with both right and left hand threads, for co-operation with the reversely threaded portions of the parts $c'$ and $c^2$. In the embodiment of the invention illustrated in Figures 7, 8, 9 and 10, the nut $d^2$ is formed in two parts $d^3$ and $d^4$, which may be held in proper relation by dowel pins $d^5$, the complete nut being tapped out with cross threads as indicated at $d^6$. This two part nut is tapered and threaded externally, at each end, as indicated at $d^7$, so that each end may be engaged by a clamping nut $d^8$ and all parts be held thereby against accidental movement.

Other embodiments of the invention will be suggested by different conditions of use and it is to be understood that the invention, except as pointed out in the claims, is not limited to the precise construction shown and described herein.

I claim as my invention:

1. A turnbuckle comprising two parts flattened to co-operate with each other and threaded reversely, and a cross threaded nut engaging the threaded portions of both parts, the nut being split longitudinally so that it may fit tightly on said threaded portion.

2. A turnbuckle comprising two parts flattened to co-operate with each other and threaded reversely, and a cross threaded nut engaging the threaded portions of both parts, the nut being formed of two separate longitudinal parts tapered and threaded externally and provided with clamping nuts.

This specification signed this 5 day of October, A. D. 1921.

CURTIS HUSSEY VEEDER.